United States Patent [19]

Cerny

[11] Patent Number: 5,288,025
[45] Date of Patent: Feb. 22, 1994

[54] FUEL INJECTOR WITH A HYDRAULICALLY CUSHIONED VALVE

[75] Inventor: Mark S. Cerny, Sterling Hgts., Mich.

[73] Assignee: Chrysler Corporation, Highland Park, Mich.

[21] Appl. No.: 993,251

[22] Filed: Dec. 18, 1992

[51] Int. Cl.⁵ .......................................... F02M 51/06
[52] U.S. Cl. ........................... 239/533.8; 239/533.9; 239/533.11; 239/585.1; 251/50; 335/277
[58] Field of Search ............... 239/585.1–585.5, 239/533.2–533.9, 584, 533.11; 251/50; 335/257, 271, 277

[56] References Cited

U.S. PATENT DOCUMENTS

| | | | |
|---|---|---|---|
| 1,252,254 | 1/1918 | Fisher | 123/294 |
| 1,498,034 | 6/1924 | Hesselman | 239/533.8 |
| 2,126,623 | 8/1938 | Dow | 239/533.3 |
| 2,148,192 | 2/1939 | Dow | 239/533.3 |
| 2,769,669 | 11/1956 | L'Orange | 239/584 X |
| 4,168,804 | 9/1979 | Hofmann | 239/533.11 |
| 4,186,708 | 2/1980 | Bowler | 123/472 |
| 4,231,525 | 11/1980 | Palma | 239/585.2 |
| 4,245,789 | 1/1981 | Gray | 239/585.2 |
| 4,247,052 | 1/1981 | Gray | 239/585.2 |
| 4,274,598 | 6/1981 | Wilfert et al. | 239/585.4 |
| 4,275,844 | 6/1981 | Grgurich et al. | 239/533.3 |
| 4,275,845 | 6/1981 | Müller | 239/533.12 |
| 4,306,680 | 12/1981 | Smith | 239/87 |
| 4,331,317 | 5/1982 | Kamai et al. | 251/129.21 |
| 4,342,427 | 8/1982 | Gray | 239/585.2 |
| 4,375,274 | 3/1983 | Thoma et al. | 239/533.12 |
| 4,392,612 | 7/1983 | Deckard et al. | 239/88 |
| 4,406,404 | 9/1983 | Horino et al. | 239/91 |
| 4,434,765 | 3/1984 | Eshelman | 123/472 |
| 4,515,129 | 5/1985 | Stettner | 123/472 |
| 4,520,962 | 6/1985 | Momono et al. | 239/488 |
| 4,572,146 | 2/1986 | Grunwald et al. | 123/549 |
| 4,621,772 | 11/1986 | Blythe et al. | 239/585.4 |
| 4,795,097 | 1/1989 | Greiner et al. | 239/585.4 |
| 4,878,650 | 11/1989 | Daly et al. | 251/50 X |
| 4,971,254 | 11/1990 | Daly et al. | 239/489 |
| 5,012,981 | 5/1991 | Holzgrefe et al. | 239/487 |
| 5,207,384 | 5/1993 | Horsting | 239/585.4 X |

*Primary Examiner*—Andres Kashnikow
*Assistant Examiner*—Lesley D. Morris
*Attorney, Agent, or Firm*—Kenneth H. MacLean

[57] ABSTRACT

An improved fuel injector for an internal combustion engine which produces highly accurate fuel delivery control by providing a precise closing of the valve without secondary openings caused by rebound or bouncing of the valve from its seat surface after initial closing. Valve rebound is eliminated by a hydraulic cushion formed between parallel surfaces of the movable valve and its stationary guide whereby a thin boundary layer of liquid fuel caught between closely spaced surfaces is compressed just prior to engagement of the valve with its valve seat. This generates an opposing force to the force tending to close the valve.

3 Claims, 2 Drawing Sheets

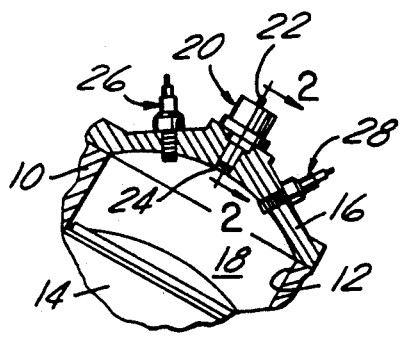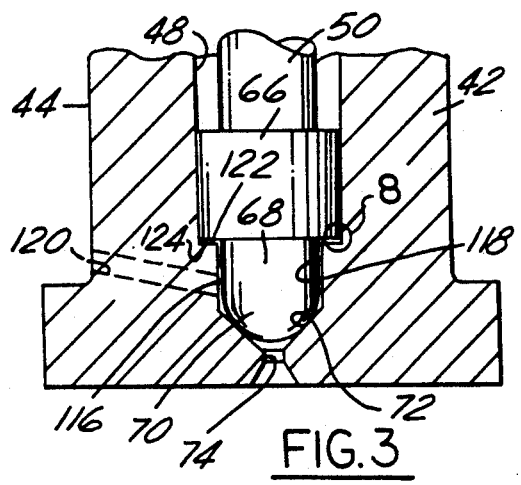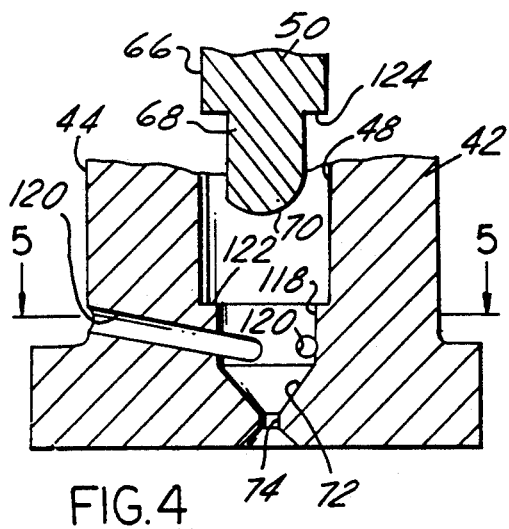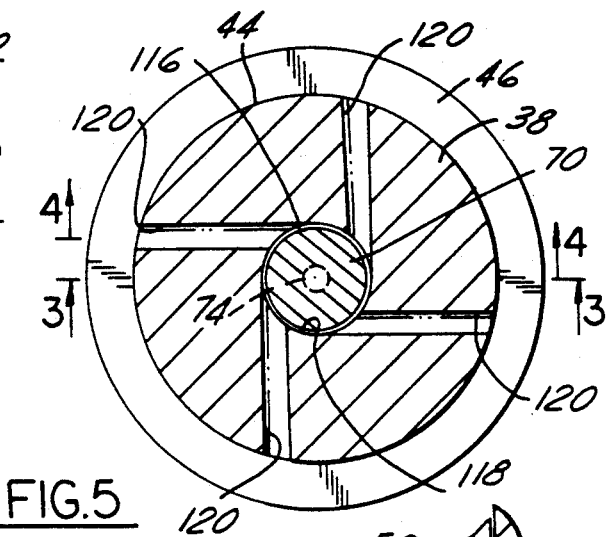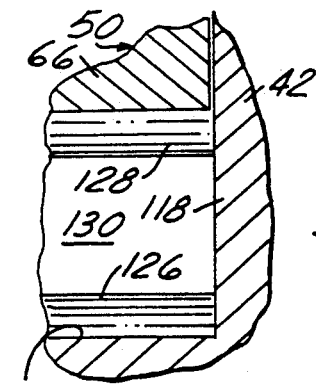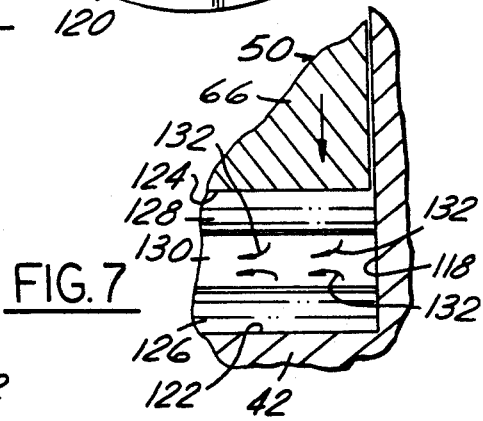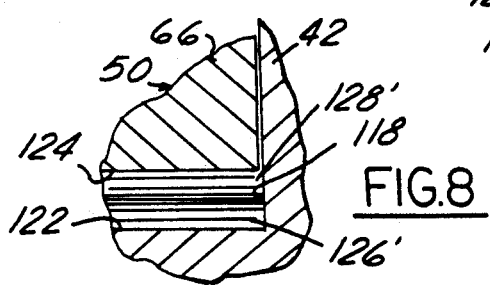

FUEL INJECTOR WITH A HYDRAULICALLY CUSHIONED VALVE

BACKGROUND OF THE INVENTION

Field of the Invention

This application concerns an improved electronic fuel injector for an internal combustion engine with structure to precisely control the closing characteristic of the injector's valve which opens and closes to regulate fuel flow to the engine. This precise control produces an extremely accurate fuel delivery for each opening and closing cycle. In contrast, other fuel injectors exhibit relatively imprecise valve control which is usually characterized by a severe impact on valve closing followed by one or more valve rebounds with respect to the valve seat surface. Valve rebounding produces secondary valve openings and causes unplanned and increased fuel delivery to the engine. This excess fuel flow decreases combustion efficiency. Also, it has been found that the fuel delivered during valve rebound is usually poorly atomized, further resulting in combustion inefficiencies.

The subject fuel injector hydraulically cushions the valve closing impact. The hydraulic cushioning is produced by a pair of relatively movable surfaces of the injector which compresses liquid fuel caught therebetween. The resultant force acts on the valve to cushion closing impact of the valve against the seating surface.

Description of Related Art

An objective of any fuel injector is accurate fuel delivery to the engine's combustion chambers. The subject fuel injector is a pulse width modulated type fuel injector which is electronically controlled by computer or electronic control unit. The computer directs the injector to open and to close and this type of injector is particularly adapted for controlling fuel delivery to a single cylinder. The quantity of fuel delivered by the injector for each combustion event is determined by the period of time that the computer causes the injector valve to remain in the opened operative position. This period of time varies depending on a number of inputs to the computer such as engine speed, vehicle speed and load. For delivery of the predetermined correct quantity of fuel to the engine, it is expected that the valve will close precisely.

A spring closes the valve and this causes a severe impact with the valve's seating surface upon closing. Without the subject hydraulic cushioning, valve rebounding with secondary openings usually occurs. During a secondary opening, a greater quantity of fuel will be delivered by the injector than as planned. The excessive fuel delivery problem is made even worse when the injector operates at relatively high fuel pressures common for direct injection into a combustion chamber.

In a pre-examination patent search, a substantial number of prior patents have been uncovered. None of these patents disclose the hydraulic cushioning for the injector valve. The following patents were uncovered: U.S. Pat. Nos. 1,252,254; 1,498,034; 4,168,804; 4,186,708; 4,231,525; 4,245,789; 4,247,052; 4,275,844; 4,275,845; 4,306,680; 4,331,317; 4,342,427; 4,375,274; 4,392,612; 4,406,404; 4,434,765; 4,515,129; 4,520,962; 4,572,146; 4,621,772; 4,795,097; 4,971,254; and 5,012,981.

SUMMARY OF THE INVENTION

As mentioned above, the subject fuel injector is a pulse width modulated type. In it, a valve regulates fuel flow by movement from a normally closed position to an opened position. The valve is moved to the opened position by energization of an electromagnetic solenoid or device. The quantity of fuel delivered by the injector is determined by the length of time the electromagnetic device is energized. This energization time is determined by an electronic control unit or computer responding to many engine parameters or input signals, such as engine speed and engine load.

As mentioned, the valve is opened by energization of an electric solenoid. A return spring yieldably opposes the opening of the valve by the solenoid. Upon deactivation of the solenoid, the return spring quickly moves the valve to the closed position against its seating surface. This closing action tends to slam the valve against the seating surface with great impact. To cushion this impact, the injector includes a pair of relatively movable, opposed surfaces which approach one another as the valve closes. Liquid fuel is trapped or caught between the surfaces just prior to valve closure and subsequent compression of the liquid fuel creates a hydraulic cushioning effect for the impact of valve closing. Resultantly, valve rebounding is less likely.

During valve closing, a thin skin or film of liquid fuel adheres to each surface while liquid further from the surface is relatively free to move relative to the surface. The thin films are relatively resistant to movement away from the surface compared to the more remotely situated liquid fuel. The previously described hydraulic cushion is generated by squeezing or compressing this thin film of liquid fuel as the surfaces come together.

One of the surfaces is formed on the movable valve and a second of the surfaces is formed on a stationary portion of the injector. Both surfaces are located upstream of the valve seat. These opposed surfaces lie in parallel planes and are spaced very close to one another even when the valve is in a fully opened position but are even closer when the valve is in its closed position. For example, in the subject preferred embodiment, the valve travels or opens only about 0.075 millimeters from the closed position. The surfaces are spaced about 0.1 millimeters when the valve is opened and only about 0.025 millimeters when the valve is closed. When the valve begins to close, liquid fuel is forced out from between the surfaces. However, as the valve nears contact with the seating surface, the thin films of fuel adhering to the surfaces begin to be compressed. This produces a hydraulic cushioning force which opposes valve closing by the action of the spring. As a result, the closing impact is greatly reduced.

Further advantageous features of the subject fuel injector will be more readily apparent from a reading of the following detailed description of a preferred embodiment which is illustrated in the accompanying drawings as described below.

IN THE DRAWINGS

FIG. 1 is an elevational view of the subject fuel injector mounted in a cylinder head in section of a combustion chamber of a two cycle type internal combustion engine; and FIG. 2 is an enlarged elevational sectioned view of the subject injector in the cylinder head; and FIG. 3 is a greatly enlarged elevational sectioned view of the lower outlet portion of the subject injector shown in its closed operative condition taken along section line 3—3 in FIG. 5 and looking in the direction of the arrows; and FIG. 4 is a sectioned view taken along section line 4—4 in FIG. 5 looking in the direction of the arrows but having the valve element withdrawn past the open most position to reveal features; and FIG. 5 is a planar and fragmentary sectioned view of the subject injector taken along section line 5—5 in FIG. 4 and looking in the direction of the arrows; and FIG. 6 is an extremely enlarged view of the portion within encircled area 8 in FIG. 3 but with the valve in its upwardmost open operative position; and FIG. 7 is similar to FIG. 6 but with the valve in a midposition between opened and closed operative positions assumed as the valve moves downward toward its seating surface; and FIG. 8 is similar to FIGS. 6 and 7 but with the valve in a downward closed operative position.

DETAILED DESCRIPTION OF A PREFERRED EMBODIMENT

Figure 2:
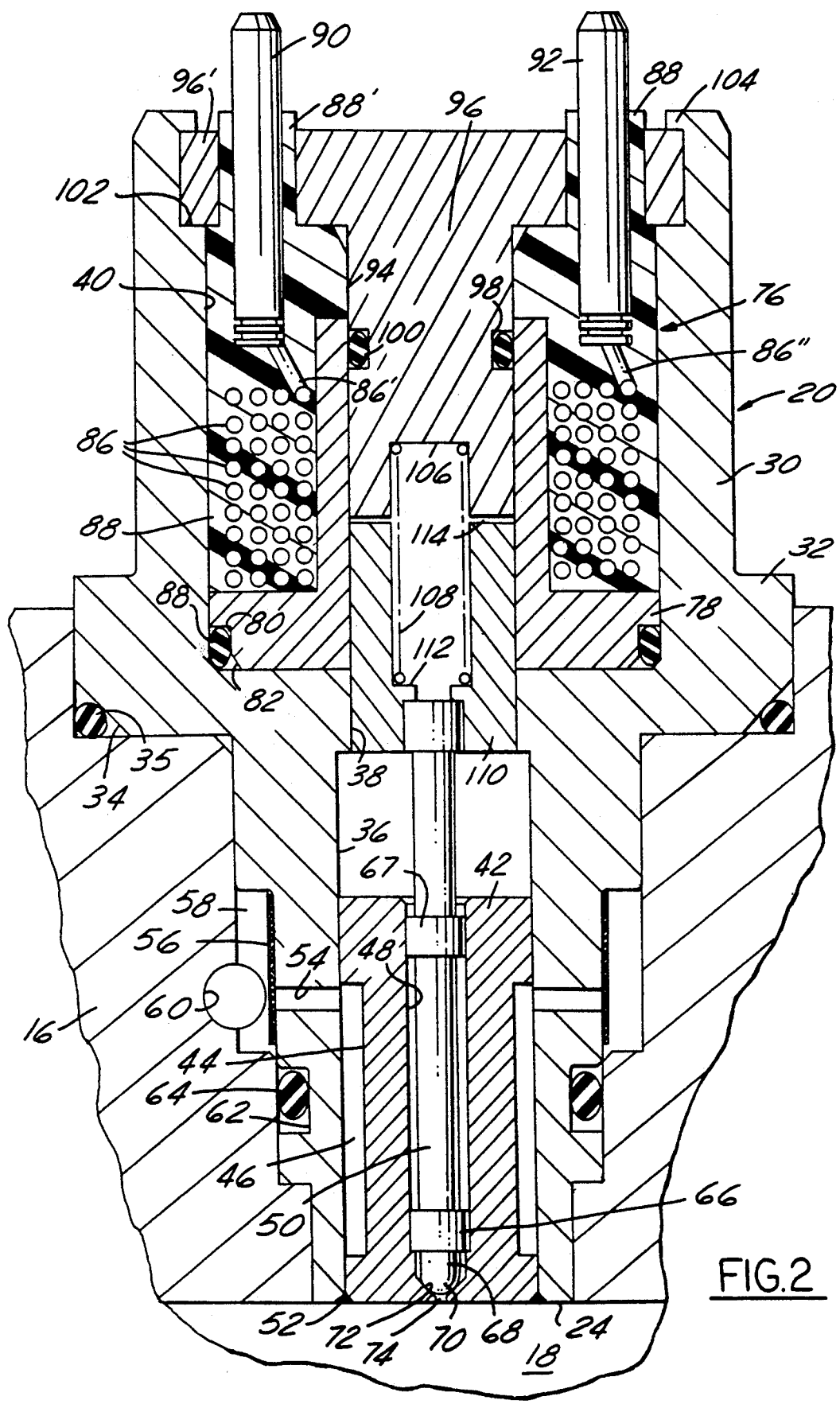

In FIG. 1, an engine block 10 is partially shown and a cylinder bore 12 is shown therein. An upper portion of a piston 14 is shown in block 10 as supported in the cylinder bore 12. Piston 14 is adapted for reciprocation therein. Also, a portion of a cylinder head 16 is shown above piston 14. As is known in the engine art, cylinder head 16 extends over bore 12 and is attached to the block 10 to define an engine combustion chamber 18 with these other parts.

Cylinder head 16 has a recess therein in which a fuel injector 20 is mounted. The injector 20 has electrical contacts 22 (only one is visible) at the exterior end portion for selectively energizing the fuel injector. An interior end 24 of the injector 20 faces the combustion chamber 18 for delivery of fuel thereto. A pair of spark plugs 26, 28 are threadably mounted in the cylinder head 16 for igniting the fuel. Electrical cables (not shown) direct high voltage electrical energy to the spark plugs at an appropriate time to create a spark in the combustion chamber 18.

Details of the subject fuel injector 20 are illustrated in FIG. 2. The injector has a generally cylindrical housing 30 with a radially enlarged annular portion 32 at its midportion. The injector 20 is adapted to be received within an enlarged recess in the cylinder head. Annular portion 32 has a beveled corner 34 which coacts with corner walls of the recess to form a pocket or cavity and an O-ring type seal 35 is supported in the cavity to seal housing 30 relative to the cylinder head 16.

The injector housing 30 has interior coaxial bores 36, 38 and 40. Bore 36 extends from interior end 24 and supports a valve guide member 42. A groove or channel 44 formed in the midportion of guide member 42 cooperates with a surrounding portion of housing 30 to define a fuel supply chamber 46. Member 42 has a central bore 48 extending partly therethrough in which an elongated valve element 50 is supported for movement. Member 42 is attached to housing 30 at an inner end portion 24 by a weld 52 which also seals the connection between members 30 and 42.

Fuel is introduced into supply chamber 46 through inlet passages 54 in housing 30. A filter or screen member 56 overlies housing 30 and extends over passages 54. Fuel enters inlet passages 54 from an annular chamber 58 formed between housing 30 and a recess formed in the cylinder head 16 and fuel is supplied to chamber 58 through a passage 60 which extends longitudinally through cylinder head 16. A channel 62 in the housing 30 supports an O-ring type seal 64 which prevents leakage from chamber 58.

In the illustrated embodiment, a pair of axially spaced and radially enlarged portions 66, 67 of the valve element 50 are sized relative to the bore 48 to provide a close fit to inhibit leakage but still allow axial movements of the valve 50. Alternatively, the valve element can have a continuous diameter between portions 66 and 67. Below portion 66, the lower end portion 68 of valve element 50 is cylindrical with semi-spherically shaped end surface 70. When valve element 50 is in a closed operative position, end surface 70 seats against a conical seating surface 72 which is formed in guide member 42. A small outlet aperture or port 74 directs fuel into combustion chamber 18 when the valve's end surface 70 is moved upwardly from seating surface 72.

The valve element 50 is adapted to be cycled in an axial direction between the illustrated closed operative position and an opened operative position. This cycling occurs once for each combustion event. The period of time which the valve is in an opened position varies the quantity of fuel to be delivered to the engine. An electromagnetic actuator is provided to open the valve element 50 and is supported within the bore 40 in housing 30. The actuator includes a coil assembly 76 with a bobbin member 78 which is molded of high strength elastomeric material. An edge or corner groove 80 and bevel 82 is formed in the bobbin member 78 to define a space for supporting an O-ring seal 84.

The electrical aspect of coil assembly 76 includes a wire 86 which is coiled spirally about the outer surface of the bobbin member 78. The wire coil 86 is encapsulated within a molded cover material 88 also of elastomeric material. The opposite ends 86' and 86" of the coil are connected to electrical terminals 90, 92 which are also partially encapsulated by the cover material 88 but with upper ends exposed for connection to electrical leads (not shown) from the computer.

The bobbin 78 and cover 88 together define an interior bore 94 through the assembly 76. A central portion of a pole piece member 96 extends into the bore 94. Further, the bore 94 and bore 38 in housing 30 are coaxial and of the same diameter. A groove 98 is formed about the midportion of pole piece 96 for receiving an O-ring sealing member 100. Besides its central portion, the pole piece has an upper radially enlarged head portion 96' which is adapted to seat against a shoulder 102 formed in housing 30. After insertion of the assembly 76 into the housing 30, an upper edge portion 104 of the housing is mechanically deformed or turned inward to secure the pole piece to the injector.

The lower end portion of the pole piece 96 has a central recess 106 formed in its lower end for receiving the upper end of a coil type spring 108. Below the pole piece 96, an armature member 110 is supported for reciprocation in bores 38 and 94. Armature 110 has a recess 112 formed opposite recess 106 for receiving the lower end of coil spring 108.

The upper end portion of the valve element 50 is connected to armature 110 so as to move as one in the axial direction defined by bores 38, 48 and 94. Spring 108 tends to urge the armature 110 and valve 50 downwardly to the valve's closed position. When the coil 86 is energized, the electromagnetic actuator 76 moves the armature 110 and valve 50 upwards to the valve's opened position. The maximum opening of the valve 50 is limited by the axial gap 114 between the lower end of the pole piece 96 and the upper end of the armature 110. It can be understood that the spring forces the armature 110 and valve 50 to a closed position when the coil is deenergized and the magnetic field collapses.

The outlet end (lower) portion of injector 20 is shown in FIGS. 3 and 4 on an enlarged scale. In FIG. 3, valve element 50 is in its closed operative position with end 70 seated against surface 72. At the enlarged scale, it can be seen that the fit between the radially enlarged portion 66 and the bore 48 is close. An annular chamber 116 is formed between the bore 48 of guide member 42 and the cylindrical end portion 68 of valve element 50. The annular chamber 116 is very narrow in the radial direction as determined by the width which is determined by calculating half the difference between the diameters bore 118 and of cylindrical end 68. In the preferred working embodiment, this width is only 0.1 millimeters. The height of chamber 116 is only about one millimeter. The volume of the chamber 116 is only about 0.6 cubic millimeters. The volume of the space within bore 118 (without displacement of end portion 68 and end 70) is about 3.1415 cubic millimeters. Consequently, the annular chamber 116 occupies only about 19 percent of the larger space.

FIG. 4 is a view taken along section line 4—4 in FIG. 5 and is similar to FIG. 3 except that the end portion of the valve element 50 has been withdrawn upwardly from bore 48 to an extent far greater than gap 114 would ever permit but this is done so that one may better see the chamber 116 and the fuel inlets thereto. Thus, four fuel inlet passages 120 entering chamber 116 are visible. Each inlet 120 is small with a diameter of only about 0.4 millimeters. Consequently, when the valve 50 opens, fuel travels quickly into space 116 a relatively high velocity.

As best illustrated in FIG. 5, inlets 120 extend from outer chamber 46 through the guide member 42 past the inner surface forming bore 118 and into chamber 116. The inlets 120 are oriented through guide member 42 so that fuel is discharged tangentially into the chamber 116. Almost instantaneously after end 70 lifts from seat 72, fuel swirls in a generally rotative direction about chamber 116. Testing confirms that this construction and resultant swirling action promotes a very fine atomization of fuel as it is discharged from outlet 74. In fact, average fuel particle size has been about ten microns or less when the fuel pressure is about 1000 psi.

As previously explained, the quantity of fuel delivered by the injector is controlled by the length of time the valve 50 is opening as directed by the computer based on inputs such as engine speed and load. However, the period of open time is calculated assuming a precise closing action of valve element 50. As previously mentioned, most injectors are not very precise because the closing impact of the valve with the seating surface produces a rebound of the valve after the initial contact and elastic deformation of the valve and seating surface. Even one rebound allows excess fuel to be delivered which is undesirable.

The subject fuel injector is designed with a very precise valve closing action for each combustion event. Valve rebound or bounce is inhibited by greatly reducing valve closing impact upon closing of the valve. This cushioning is accomplished by compressing liquid fuel between movable surfaces of the injector. Specifically, the valve guide member 42 has an annular shoulder surface 122 which preferably lies in a plane normal to the axis of bore 48 and elongated valve 50. Similarly, the enlarged lower end portion 66 of valve element 50 defines a surface 124 which is also preferably normal to the axis of bore 48 and valve 50. The surfaces 122 and 124 are positioned opposite one another. Even when the valve is fully opened, the surfaces are closely spaced. As the valve closes, the surface 124 moves toward surface 122.

The known theory for thin films explains the phenomenon of resistance to movement of a thin layer of liquid along a surface. It is known that liquid very close to a surface strongly resists movement relative to that surface while liquid further away from the surface has less resistance to movement. The design of the subject injector uses these principles to advantage by creating a hydraulic cushion for the closing movement of the valve. The cushioning decreases the impact upon valve closing and inhibits rebound action of the valve. In FIGS. 6-8 the area of the injector adjacent shoulder 124 as circled in FIG. 3 is very greatly enlarged. In FIG. 6, the valve 50 is in the fully opened operative position. In FIG. 7, the valve 50 has moved toward the closed position. In FIG. 8, the valve 50 is in the fully closed operative position. In the three views, thin layers of liquid fuel extend along surfaces 122 and 124 and are identified by numerals 126 and 128, respectively. Although the films 126, 128 are illustrated as distinct layers with a definite thickness in FIGS. 6-8, in reality the degree of adherence or resistance of the liquid to movements along the adjacent surface is strongest immediately adjacent the surface and diminishes as the distance outwardly increases. One should also be aware that the space 130 between layers 126, 128 is composed of liquid fuel. However, this portion of the liquid is relatively free to move away from and/or along the adjacent surface.

In the preferred embodiment, surfaces 122, 124 are separated only about 0.1 millimeter when the valve is fully open as shown in FIG. 6. A relatively non-adhering or free portion 130 of fuel separates thin films 126, 128 covering surfaces 122, 124 respectively. In FIG. 7, the closing valve 50 has moved downward toward its closed position and liquid fuel in the non-adhering or free layer 130 rapidly moves to the left and away from the wall 118 into the central chamber 116. This liquid movement is illustrated by small arrows 132. As shown in FIG. 8, as valve 50 nears its closing contact with seating surface 72, the relatively easily moved liquid 130 has been discharged into chamber 116 and the relatively immobile liquid in layers 126, 128 remains in place between surfaces 122, 124. As the valve and valve seat contact and begin elastically deforming, these films are compressed or squeezed to produce an upward opening force on the valve element 50. This hydraulic damping technique has been found to be effective in yieldably opposing forces on the valve 50 by the spring 108 and reducing closing impact. The resultant hydraulic cushioning greatly inhibits any significant valve rebound motion.

Although only one embodiment have been illustrated and described in detail, it should be understood that modifications are contemplated which fall within the scope of the invention as defined by the following claims.

What is claimed is as follows:

1. An improved fuel injector for an internal combustion engine, comprising: housing enclosure means defining an interior and including a valve guide portion with an aperture at one end for delivering fuel to the associated engine from the interior of said housing enclosure; a valve seating surface defined by the said guide portion adjacent said aperture; an elongated valve element with an end portion configured and normally engaging said seating surface when said valve element is in a closed operative position blocking fuel flow to said aperture; said valve guide portion supporting said valve element to permit opening movements of said valve element in the axial direction of said valve element which involves movement of said end portion away from said seating surface, thereby allowing a precise flow of fuel to said aperture; yieldable means exerting a closing force on said valve element so as to urge its end portion against said seating surface; valve actuating means which can be selectively energized to exert an opening force on said valve element in opposition to the force of said yieldable means thereby moving said end portion away from said seating surface and passing a precise quantity of fuel to said aperture, whereby said end portion quickly moves toward said seating surface in closing whenever said selectively energized actuating means is deenergized; means to dampen the closing action of said valve element with respect to said seating surface for inhibiting a tendency of said end portion to rebound away from said seating surface upon impact causing undesirable secondary openings of said valve element; said dampening means including a first surface formed by said valve guide portion upstream of said aperture and a corresponding second surface formed by said valve element upstream of said end portion, the opposite regions of each of said first and second surfaces being spaced uniformally from each other, whereby a film thickness of liquid fuel adheres to the first and the second surfaces with liquid fuel in the film thickness resisting any substantial migration away from and along said flat surface; said film thickness being sufficient so that when said first and second surfaces approach one another as said valve element moves to its closed operative position, their spacing eventually decreases to less than the combined film thicknesses whereby the relatively immobile liquid fuel is squeezed between said first and second surfaces to generate a hydraulic force opposing the closing force of said yieldable means for diminishing the impact effects of the contact of said end portion with said seating surface.

2. The improved fuel injector set forth in claim 1 in which said film thickness adjacent said first and second surfaces resists movement generally parallel to said surfaces so that when said surfaces come rapidly toward one another, the liquid fuel does not move appreciably along the surface.

3. The improved fuel injector set forth in claim 1 in which the first and second surfaces lie in a plane generally normal to the axis of the elongated valve element.

* * * * *